H. A. MIESKE.
FOUR WHEEL DRIVE FOR AUTOMOBILES AND SIMILAR VEHICLES.
APPLICATION FILED APR. 19, 1919.
1,353,411.
Patented Sept. 21, 1920.
2 SHEETS—SHEET 2.
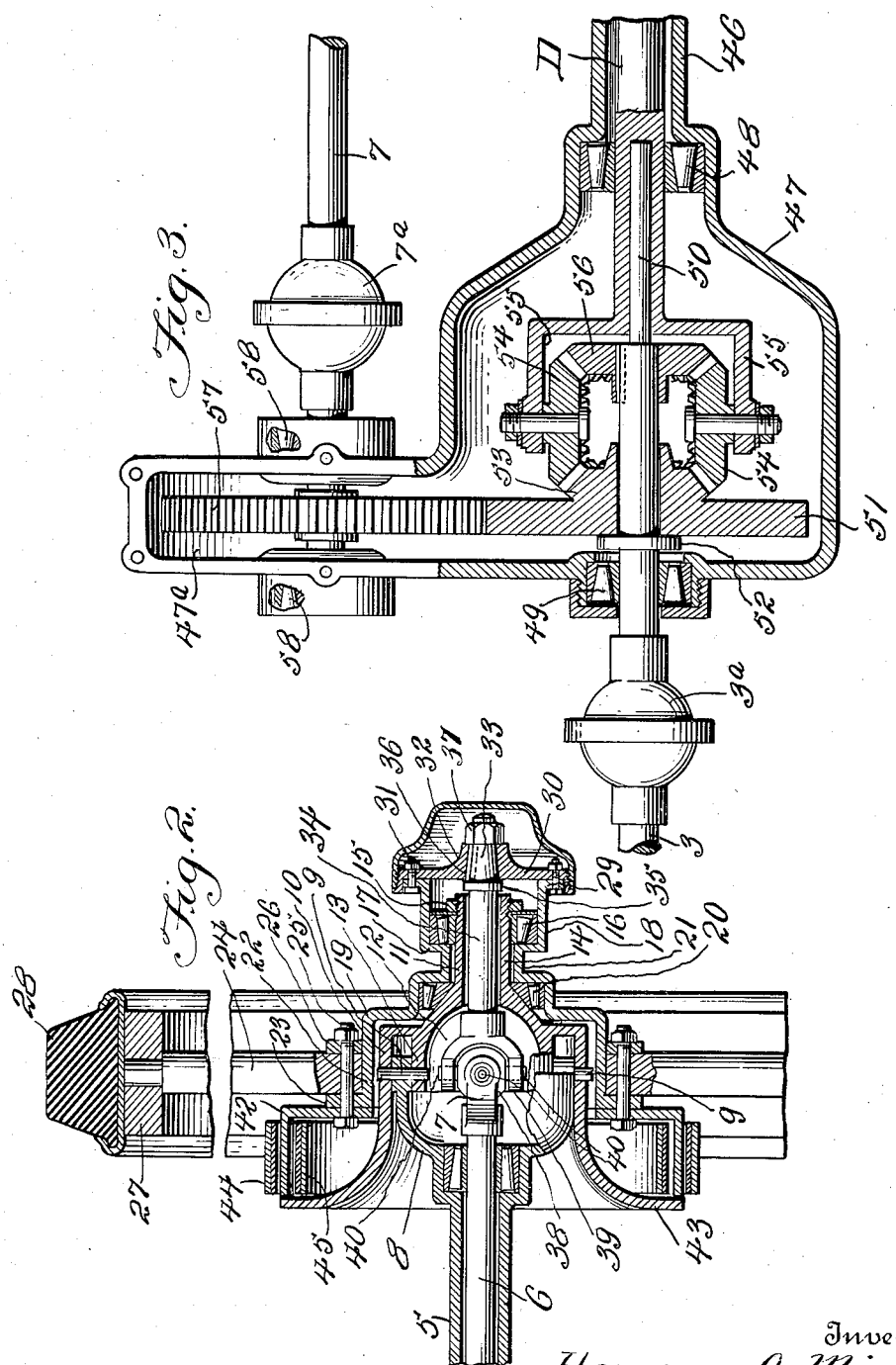

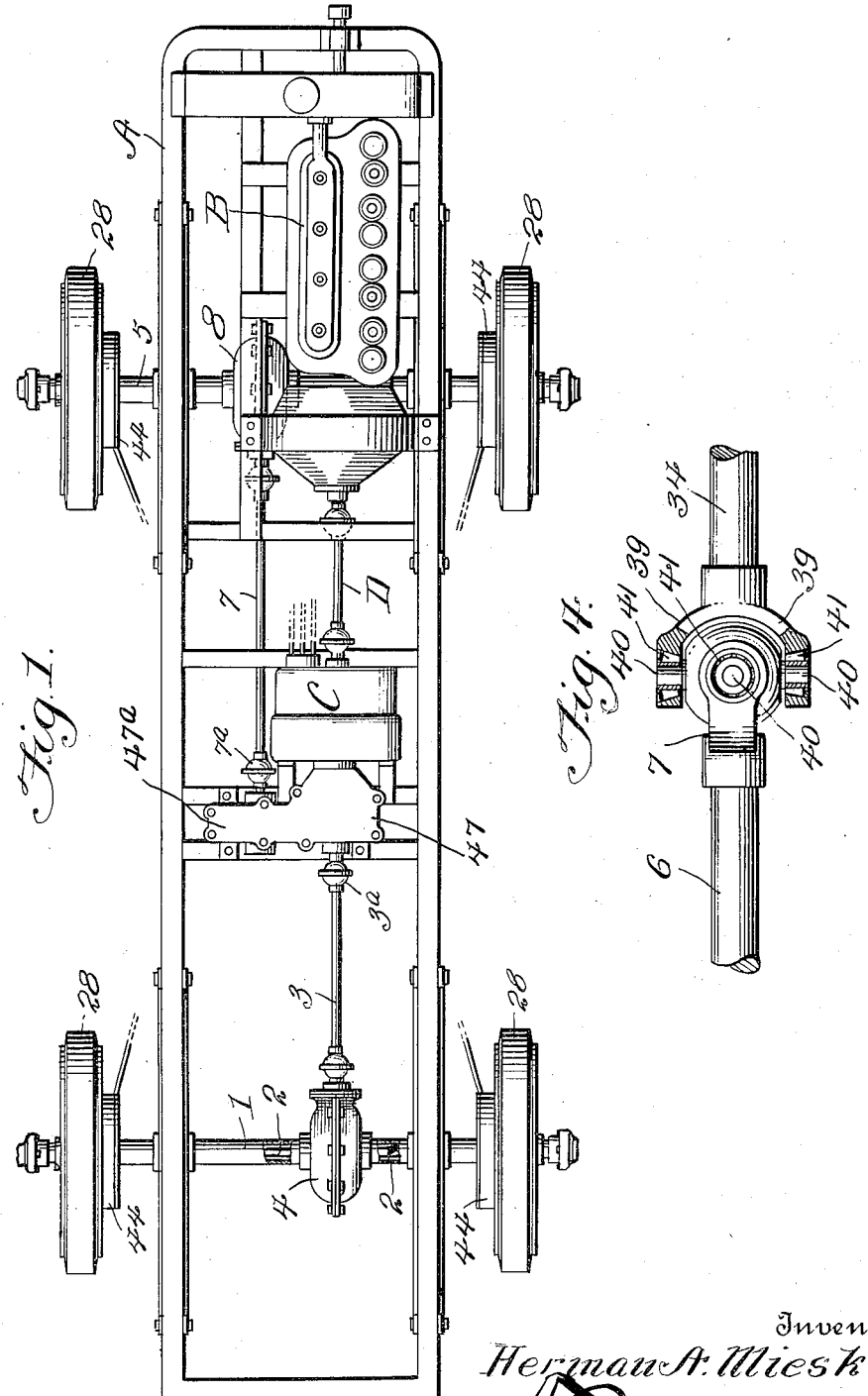

UNITED STATES PATENT OFFICE.

HERMAN A. MIESKE, OF FALL CREEK, WISCONSIN.

FOUR-WHEEL DRIVE FOR AUTOMOBILES AND SIMILAR VEHICLES.

1,353,411.  Specification of Letters Patent.  Patented Sept. 21, 1920.

Application filed April 19, 1919. Serial No. 291,315.

*To all whom it may concern:*

Be it known that I, HERMAN A. MIESKE, a citizen of the United States, residing at Fall Creek, in the county of Eau Claire and State of Wisconsin, have invented certain new and useful Improvements in Four-Wheel Drives for Automobiles and Similar Vehicles; and I do hereby declare the following to be a full, clear, and exact description of the invention, such as will enable others skilled in the art to which it appertains to make and use the same.

This invention relates to a four wheel drive vehicle, and more particularly to means whereby both the front and rear wheels of an automobile may be driven directly from the engine of the automobile so as to secure a direct and positive drive.

One of the main objects of the invention is to provide a vehicle wheel so constructed as to be connected directly to a drive shaft of an axle so as to be rotated therefrom, this wheel being capable of rocking movement about a vertical axis for steering purposes.

A further object is to provide a differential for connecting the two drive shafts for the front and the rear axles so as to accommodate differences in speed of rotation of these axles thus rendering it possible to effectively use the four wheel drive.

Further objects will appear from the detailed description.

In the drawings:

Figure 1 is a top plan view of an automobile frame showing a four wheel drive constructed in accordance with my invention applied.

Fig. 2 is a central vertical section through the wheel and the associated parts.

Fig. 3 is a horizontal section through the differential housings of the front and rear drive shafts.

Fig. 4 is a detail of the universal joint of one of the axle shafts.

The frame of the automobile designated generally by A may be of any suitable or preferred construction and supports an engine B of suitable type having the rearwardly extending transmission casing C through which extends the drive shaft D of the engine. The engine as well as the transmission therefor may be of any preferred or well known construction and forms no part of my invention except in so far as they coöperate with the means to be hereinafter described to accomplish the desired results.

An axle housing 1 is mounted adjacent the rear of the frame and contains the axle shafts 2 which are adapted to be rotated by means of the rear drive shaft 3 through the medium of a differential of standard construction positioned within the differential casing 4 at the central portion of housing 1. A similar axle housing 5 is positioned adjacent the forward end of the frame and contains the axle shafts 6 rotatably mounted therein which are rotated by means of the front drive shaft 7 which projects forwardly of the engine and is positioned to one side thereof, this drive shaft being connected to the axle shaft through the medium of a differential contained within a differential casing 8 positioned to one side of the center of housing 5. By this arrangement, when the engine is in operation, the front and rear axle shafts may be simultaneously rotated therefrom in the well known manner for the purpose of propelling the vehicle.

As will be noted more clearly from Fig. 2 of the drawings, each shaft 6 of the front axle is provided, at its outer end, with a fork 7 which projects outwardly between the upper and lower arched supporting arms 8 formed at the outer end of the axle housing 5. These arms receive spindle pivot bolts 9 inserted therethrough and through the inwardly projecting annular flange 10 of a hollow spindle 11 having a substantially frusto-spherical body 12 provided at its base with inwardly projecting ears 13 which are positioned inside of the outer ends of arms 8, these arms fitting snugly between the ears and the flange. The spindle 11 is further provided with a reduced outwardly projecting neck 14, the outer end portion of which is exteriorly threaded to receive a securing collar 15 screwed thereon and bearing against the outer face of a roller bearing cage 16. This cage is of substantially frusto-conical shape and fits in a correspondingly shaped portion 17 of an enlarged head 18 of a wheel hub designated generally by 19. This cage contains roller bearings of suitable type which serve to provide an antifriction bearing for the outer end portion of neck 14, the cage coöperating with collar 15 to secure the spindle against inward movement. A roller bearing cage 20 is also positioned between the hub 19 and spindle 11 adjacent the juncture of the reduced neck 21 and the enlarged substantially frusto-spherical body 22 of the hub which is substantially concentric with body 12 of the spindle. This cage also contains roller bearings for supporting the spindle so as to reduce friction to a minimum. At its inner end or base, head 22 is provided with an outer annular flange 23 to which are secured a plurality of radiating spokes 24, by means of securing bolts 25 inserted therethrough and through a securing ring 26 and flange 23. The spokes support a rim 27 upon which is mounted a tire 28 of any suitable or preferred construction. As will be noted, the pivot bolts 9 for the spindle are positioned at diametrically opposite sides of the spindle and in the plane of the transverse center of spokes 24, the wheel composed of the hub together with the spokes and associated parts being so mounted upon the spindle as to be readily rocked in accordance with movement thereof about the bolts 9. This renders it possible to easily rock all of the wheels of the vehicle in proper direction, through the medium of the usual or any preferred steering gear, for steering the vehicle. Head 18 of hub 19 is provided, at its outer end, with an outer annular flange 29. A cap plate 30 fits over the outer end of head 18 and is secured thereto by bolts 31 inserted through the cap plate and the flange 29. This cap plate is provided with a central boss 32 which is centrally apertured to receive the outer tapered portion 33 of a stub shaft 34 extending through the neck 14 of spindle 11 centrally thereof. Outward movement of this stub shaft through plate 30 is positively limited by an annular collar 35 positioned adjacent the inner end or base of the tapered portion 33. This stub shaft is secured to plate 30 by a key 36 fitted in coöperating grooves provided in the element 33 and boss 32. This key is held in position by a securing nut 37 screwed upon the projecting end portion of stub shaft 34, this nut coöperating with the collar 35 to prevent endwise movement of the stub shaft. It will be evident that, by rotating stub shaft 34, rotary movement will be imparted to the wheel for the purpose of propelling the vehicle, this wheel being supported upon the spindle therefor so as to be rockable about a vertical axis for steering purposes in the manner previously described.

The fork 7 of shaft 6 extends about a coupling block 38 which is positioned between the arms of a fork 39 provided at the inner end of stub shaft 34. As will be readily understood, the fork 7' is disposed in a plane at right angles to the plane of fork 8, and the arms of each of these forks are provided with openings through which project pins 40 secured in block 38, suitable roller bearings 41 carried by the usual cages being mounted in the arms of the forks about each of the pins so as to insure ease and accuracy of operation and reduce friction to the minimum. When the front and rear drive shafts are rotated from the engine, rotation will be imparted to the wheels of the vehicle through the axle shafts and the universal joints connecting the outer ends thereof to the stub shafts of the wheel spindles, these joints permitting rocking of the wheel spindles about their axes for steering of the vehicle. In this manner, I obtain the direct drive for all four wheels of the vehicle, thus insuring maximum efficiency and reducing loss of power due to friction or other causes to a minimum.

A brake drum 42 is secured to the inner face of flange 23 of the body of the hub 19 by means of bolts 25 which are also inserted through this drum. This drum is positioned adjacent an inner annular flange 43 provided at the inner end of the body 12 of spindle 11, this flange constituting a closure member for the inner side of the drum so as to prevent, to a great extent, entry of dirt, grit, and other foreign materials into the same. The brake drum 42 coacts with inner and outer brake bands 44 and 45, respectively, positioned adjacent the same for frictional engagement therewith, these bands being actuated in any suitable or well known manner, for braking the wheels to stop or retard travel of the automobile. In this connection, the flange 43 acts as a retaining member for effectually preventing slipping of the brake bands from the drum. As stated, these bands may be operated in any preferred or well known manner, it being understood that the bands are, when in use, forced into frictional engagement with the inner and outer faces of the flange of the drum for retarding or stopping rotation thereof.

As will be noted more clearly from Fig. 3, the drive shaft D of the engine is contained within the housing 46 projecting rearwardly from the transmission casing, this housing being enlarged to provide a differential casing 47 into which the shaft D projects, this shaft being supported within the housing 46 adjacent the rearward end thereof by roller bearings 48. The rear drive shaft 3 projects into housing 47, being rotatably supported in the rearward wall thereof by roller bearings 49 in axial alinement with shaft D. The forward end portion of this shaft is reduced to form a cylindrical extension 50 which fits into a corresponding bore provided in the rearward end portion of shaft D. A spur gear 51 is loosely mounted upon the inner portion of shaft 3, this gear being held against movement axially of the shaft toward the back of casing 47 by an annular flange 52 formed on the shaft. Gear 51 is provided, on its forward face, with an integral bevel gear 53 which meshes with bevel pinions 54 rotatably mounted in the oppositely directed arms 55 formed at the rearward end of shaft D. These pinions also mesh with a bevel gear 56 keyed on shaft 3 adjacent the reduced cylindrical element 50 thereof. Spur gear 51 meshes with a similar spur gear 57 keyed on the rearward portion of shaft 7 and positioned within the extension 47$^a$ of differential casing 47, the rearward portion of this shaft being rotatably supported in the casing by the roller bearings 58. The differential gearing thus produced serves to normally cause simultaneous rotation of the front and rear drive shafts for propelling the vehicle while accommodating differences in speed of rotation of the shafts during turning or maneuvering of the vehicle. The provision of the two drive shafts and the differential gearing connecting the same, together with the stub shafts connected to the shafts of the axles by universal joints, renders it possible to drive all four wheels of the vehicle directly from the engine thus obtaining a positive drive which results in maximum efficiency and reduces loss of power to the minimum.

To accommodate relative movement between the forward and the rearward portions of the vehicle, shaft 3 is provided with a universal joint 3$^a$, shaft 7 being provided with a similar joint 7$^a$. This permits independent movement of the front and rear axles of the vehicle without in any way interfering with the driving connections, as will be understood.

By providing the driving connections described, I produce an extremely simple four wheel drive by means of which the power may be applied equally to all four wheels of the vehicle thus insuring ease and accuracy of operation and maximum efficiency. In addition, the wheels of the vehicle are all capable of being rocked about vertical axes thus rendering it possible to employ a four wheel steering mechanism, if desired.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In a four wheel drive for vehicles, an axle housing, an axle shaft rotatably mounted therein and adapted to be rotated by the engine of a self propelled vehicle, said housing being provided at its end with diametrically opposite arched arms, a hollow wheel spindle provided at its inner end with an annular flange, pivot bolts inserted through said flange and the arms of the axle housing and serving to pivotally secure the spindle to the housing for rocking movement about a vertical axis, a flared flange outwardly of the first mentioned flange and carried by the inner end of the hollow wheel spindle, a stub shaft extending through said spindle and having a cap mounted thereon, a wheel having a hollow hub fitting rotatably mounted on the spindle, a brake carrying flange carried by said wheel, brake bands mounted on said brake carrying flange, and means to prevent longitudinal movement of the wheel hub fitting upon said spindle.

2. In a four wheel drive for vehicles, an axle housing, an axle shaft rotatably mounted therein, said housing being provided at its end with branch arms, a hollow wheel spindle provided at its inner end with an annular flange and an outer flared brake supporting protecting flange outwardly of the first mentioned flange, pivot bolts inserted through said flanges and through the arms of the axle housing to permit of rocking movement of the spindle about a vertical axis, a stub shaft extending through the spindle and terminating in a reduced end with a threaded extremity, a hub cap plate keyed to said reduced end, a nut threaded on said threaded extremity to prevent withdrawal of said plate, a wheel having a hollow hub fitting with a reduced portion rotatably mounted on said hollow wheel spindle, a cap carried by said hollow hub fitting and connected with said cap plate to prevent longitudinal movement of said hollow hub fitting upon said hollow wheel spindle, bearing means to either side of the reduced portion of said hollow hub fitting to reduce friction to the minimum, a brake carried by said wheel adjacent and inclosed by said flared flange of the hollow wheel spindle, and a universal connection between said axle shaft and said spindle.

In testimony whereof I affix my signature in presence of two witnesses.

HERMAN A. MIESKE.

Witnesses:
 WM. J. COATES,
 LEE BLACK.